United States Patent [19]

Carnicom

[11] 4,436,636
[45] Mar. 13, 1984

[54] INVERT EMULSION WELL SERVICING FLUIDS

[75] Inventor: William M. Carnicom, Houston, Tex.

[73] Assignee: NL Industries, Inc., New York, N.Y.

[21] Appl. No.: 332,652

[22] Filed: Dec. 21, 1981

[51] Int. Cl.$^3$ .................................................. C09K 7/06
[52] U.S. Cl. .............................. 252/8.5 P; 252/8.55 R
[58] Field of Search ............ 252/8.5 M, 8.5 P, 8.55 R

[56] References Cited

U.S. PATENT DOCUMENTS

| | | | |
|---|---|---|---|
| 2,661,334 | 12/1953 | Lummus | 252/8.5 |
| 2,798,851 | 7/1957 | Nelson et al. | 252/8.5 |
| 2,861,042 | 11/1958 | Watkins | 252/8.5 |
| 2,969,321 | 1/1961 | Carpenter | 252/8.5 |
| 2,996,450 | 8/1961 | Zech et al. | 252/8.5 |
| 2,999,063 | 9/1961 | Hoeppel | 252/8.5 |
| 3,140,747 | 7/1964 | Mitacek | 252/8.5 X |
| 3,244,638 | 4/1966 | Foley et al. | 252/8.5 |
| 3,351,079 | 11/1967 | Gibson | 252/8.55 |
| 4,105,578 | 8/1978 | Finlayson et al. | 252/8.5 X |
| 4,306,980 | 12/1981 | Brandt et al. | 252/8.5 |

*Primary Examiner*—Herbert B. Guynn
*Attorney, Agent, or Firm*—Browning, Bushman, Zamecki & Anderson

[57] ABSTRACT

An invert emulsion well servicing fluid containing an oleaginous phase, an aqueous phase, an invert emulsifier and an effective amount of a solid, particulate polyolefin having a density of about 0.90 gms/cc or greater.

4 Claims, No Drawings

INVERT EMULSION WELL SERVICING FLUIDS

BACKGROUND OF THE INVENTION

The present invention relates to well servicing fluids. More specifically, the present invention relates to water-in-oil (invert) emulsions for use in well servicing operations such as work-overs, fracturing, completing, hole abandonment, etc.

Oil based well servicing fluids find particular application in fracturing and packing operations. For example, oil bearing sands of low permeability are commonly subjected to extremely high fluid pressure so as to crack them open, generally along bedding planes, and the fractures so formed are held open by solid propping agents introduced with the fracturing fluid. Such fracturing fluids are desirably oil based having a low filtration loss. Oil based fluids are also commonly used as packer fluids to fill the annular space between the casing and the walls of the hole, the oil based fluids serving to minimize corrosion and provide low fluid loss properties so that the packing fluid remains in place over a long period of time.

Invert emulsion well fluids have been developed to overcome certain deficiencies of simple oil based fluids which have long been utilized in well servicing operations described above. However, such invert emulsions, while overcoming many of the deficiencies of simple oil base fluids, have suffered from certain problems such as for example, the tendency for the oil phase to at least partially separate from the emulsion. Additionally, in many invert emulsion well servicing systems, there arise problems in controlling solids settling.

SUMMARY OF THE INVENTION

It is therefore an object of the present invention to provide an improved well servicing fluid of the invert emulsion type.

Another object of the present invention is to provide an invert emulsion well servicing fluid exhibiting minimized oil phase separation.

Yet another object of the present invention is to provide an invert well servicing fluid which minimizes solids settling.

Still a further object of the present invention is to provide a well servicing fluid having reduced fluid loss.

The above and other objects of the present invention will become apparent from the description given herein and the appended claims.

In its broadest sense, the present invention contemplates a well servicing fluid comprised of a liquid oleaginous phase, i.e. an oil phase, an aqueous phase, a suitable invert emulsifying agent, and a solid particulate polyolefin having a density of about 0.90 g/cc or greater. The polyolefin employed is preferably a high density polyethylene, i.e. one having a density greater than about 0.94 g/cc.

DESCRIPTION OF THE PREFERRED EMBODIMENTS

The oleaginous liquids (oil phase) in the well servicing fluids of the present invention are usually petroleum oils (hydrocarbons). Preferably, the oleaginous liquids should contain at least some component boiling above the gasoline boiling range, i.e. above about 400° F. at atmospheric pressure. Oils with too high a content of highly volatile hydrocarbons in the gasoline boiling range are undesirable because of the danger of fire, and because of their low viscosity. It is preferred that the oleaginous liquid have a flash point above 140° F. Non-limiting examples of suitable oleaginous liquids which can be employed in the well servicing fluids of the present invention include the following: topped crude oil, gas oils, kerosene, diesel fuel, heavy alkylates, fractions of heavy alkylates, and the like. The more preferred oils are predominantly paraffinic in character since these are less detrimental to rubber components in pumps, lines, etc. It is preferred that the oleaginous liquid have a gravity within the range of 15°-40° API. The invert emulsion well servicing fluids of the present invention will, generally speaking, contain the oleaginous liquid, the continuous phase, as the major portion, and the aqueous phase as the minor portion. Thus, the volume ratio of the oleaginous phase to the aqueous phase can be in a volume ratio of from about 99/1 to about 1/1, preferably from about 20/1 to about 2/1, most preferably from about 10/1 to about 2/1. The aqueous phase can be fresh water or a solution of water in a brine-forming, water soluble salt such as sodium chloride, calcium chloride, and the like. The amount of the water soluble salt in the aqueous phase will vary depending on the conditions under which the well servicing fluid is used. However, it is common to use fluids in which the aqueous phase is saturated with respect to the brine-forming, water soluble salt.

In accordance with the present invention, it has been found that the addition of an effective amount of a solid, particulate polyolefin to invert emulsion well servicing fluids produces fluids with minimized oil phase separation, less solids settling and lower fluid loss. The polyolefins which are useful in the well servicing fluids of the present invention include polyethylene, polypropylene, polybutenes, polyisoprenes, as well as interpolymers of ethylene with propylene, butene or isoprene. Generally speaking, such polyolefins have molecular weights of greater than 6000 and contain no unsaturated linkages in the polymer chains. The polyolefins useful in the well servicing fluids of the present invention will generally have a density of 0.90 g/cc or greater, preferably 0.93 g/cc or greater, most preferably 0.94 g/cc or greater. Polyethylenes having the latter density are generally referred to as high density polyethylenes and are linear, isostatic polymers of 95% crystallinity. The polyolefins used in the well servicing fluids of the present invention are particulate in nature, i.e. they are finally divided solids, preferably comprised of near spherical shaped particles, the average particle diameter being from about 15 to about 40 microns. A particularly preferred polyolefin useful in the well servicing fluids of the present invention is a linear, high density polyethylene known as Super Dylan, SDP-113 (hereinafter referred to as SDP-113) marketed by Atlantic Richfield Polymers. SDP-113 has the following physical properties:

| | |
|---|---|
| Density | 0.947 g/cc |
| Melt Index | 0.4 g/10 min |
| Melting Point | 126 °C. |
| Particle Dia., Avg. | 25 Microns |
| Bulk Density | 20 lb/cu ft |
| Yield | 200 sq ft/lb/mil |
| Appearance | White free flowing powder |

The polyolefin will be present in the well servicing fluids in an amount which is effective to prevent oil separation from the invert emulsion, reduce fluid loss and aid in controlling solids settling when used with a suitable viscosifier. Generally speaking, the particulate polyolefin will be present in amounts ranging from about 1 to about 20 pounds per barrel (ppb).

The well servicing fluids of the present invention will also contain an invert emulsifying agent such as disclosed in U.S. Pat. Nos. 2,861,042; 2,946,746; 3,346,489; 3,590,005; or 3,654,177. Typical water-in-oil emulsifiers include the polyamide type formed by the reaction of a polyamine with fatty acids and a dibasic acid as well as the anionic water-in-oil emulsifiers disclosed in aforementioned U.S. Pat. No. 2,861,042. Mixtures of various emulsifiers can be used, if desired. When employed, the emulsifying agent will be present, in the well servicing fluid, in an amount of from about 2 to about 20 ppb, and more preferably from about 3 to about 15 ppb.

It is also desirable that the well servicing fluids of the present invention contain a flitration control agent to aid in preventing fluid loss. Although many oil mud filtration control agents such as those disclosed in U.S. Pat. Nos. 3,168,475 and 3,494,865 can be employed, organophilic lignitic colloids prepared by reacting lignite and a quaternary ammonium salt have been found to be quite effective. Well servicing fluids containing such invert mud filtration control agents and the particulate polyolefin are especially effective in controlling solids' settling. The filtration control agent will generally be present in an amount of from about 1 to about 20 ppb of the well servicing fluid.

If desired, the well servicing fluids of the present invention can also contain suitable viscosifying agents such as for example, organophilic clays produced by reacting a smectite type clay, e.g. bentonite, and a quaternary ammonium salt. Such viscosifying agents are disclosed in U.S. Pat. No. 4,105,578, incorporated herein by reference for all purposes. When employed, the viscosifiers will be present in the well servicing fluids in amounts of from about 0.5 to about 4 ppb.

The well servicing fluids of the present invention can also contain, with advantage, lime. The term lime, as used herein, includes calcium oxide as well as any of the various chemical and physical forms of quicklime, hydrated lime, etc. The lime will generally be present in the fluids in an effective amount, up to and including about 15 ppb.

The well servicing fluids of the present invention can also contain, with advantage, weighting agents such as barite, the amount of such weighting agents present in the well servicing fluid being dependent upon the environment in which the well servicing fluid is employed. It is especially desirable, when a weighting agent is employed, that a viscosifying agent (suspension agent) such as described above be employed in the well servicing fluids.

The well servicing fluids of the present invention can be prepared by methods well known to those skilled in the art.

To more fully illustrate the present invention, the following non-limiting examples are presented. All test results were obtained in accordance with standard API procedures (API RP 13B, 7Th Ed., April 1978). In all cases, the polyolefin employed was Super Dylan SDP-113.

EXAMPLE 1

Laboratory-prepared, base invert muds were prepared by mixing together the following components in the amounts indicated:

| | |
|---|---|
| Diesel oil, bbl | 0.57 |
| INVERMUL "L",[1] lb | 10 |
| Lime, lb | 7 |
| EZ MUL,[2] lb | 2 |
| Water, bbl | 0.14 |
| GELTONE,[3] lb | 0–2 |
| BAROID,[4] lb | 380 |
| CaCl$_2$, lb | 27 |

[1,2]Trademarks of invert emulsifiers marketed by NL Baroid, Houston, Texas.
[3]Trademark of a synthetic organophilic colloid viscosifying agent marketed by NL Baroid, Houston, Texas.
[4]Trademark of a barite weighting agent marketed by NL Baroid, Houston, Texas.

The base muds as prepared above, were used to prepare 15.0 pounds per gallon (ppg) invert muds which had incorporated therein DURATONE Trademark for an (oil mud filtration control agent marketed by NL Baroid, Houston, Texas) or SDP-113. The compositions of the thus prepared muds and the test results as to oil separation, fluid loss, solids settling and rheological projections are given in Table 1 below.

TABLE 1

| Sample Mark | A | B | C | D | E |
|---|---|---|---|---|---|
| Diesel oil, bbl | 0.57 | 0.57 | 0.57 | 0.57 | 0.57 |
| INVERMUL "L", lb | 10 | 10 | 10 | 10 | 10 |
| Lime, lb | 7 | 7 | 7 | 7 | 7 |
| DURATONE, lb | 8 | — | — | — | — |
| SDP-113, lb | — | 8 | 8 | 8 | 4 |
| EZ MUL, lb | 2 | 2 | 2 | 2 | 2 |
| Water, bbl | 0.14 | 0.14 | 0.14 | 0.14 | 0.14 |
| GELTONE, lb | 2 | 2 | — | 1 | 2 |
| BAROID, lb | 380 | 380 | 380 | 380 | 380 |
| CaCl$_2$, lb | 27 | 27 | 27 | 27 | 27 |
| Stirred, min | 15 | 15 | 15 | 15 | 15 |
| Test temp, °F. | 98 | 98 | 98 | 95 | 95 |
| Plastic Viscosity, cp | 38 | 35 | 26 | 32 | 26 |
| Yield Point, lb/100 sq ft | 9 | 14 | 0 | 2 | 7 |
| 10-sec gel, lb/100 sq ft | 6 | 7 | 1 | 2 | 5 |
| 10-min gel, lb/100 sq ft | 10 | 10 | 1 | 3 | 7 |
| Stability, volts | 1280 | 920 | 1000 | 1600 | 940 |
| Settling | None | None | Severe | Slight | None |
| Rolled, hr at 150° F. | 16 | 16 | | | 16 |
| Stirred, min | 5 | 5 | | | 5 |
| Test temp, °F. | 120  95 | 120  95 | | 130 | 90 |
| Plastic Viscosity, cp | 32  37 | 32  37 | | 22 | 28 |
| Yield Point, lb/100 sq ft | 14  15 | 23  21 | | 15 | 13 |
| 10-sec gel, lb/100 sq ft | 9  9 | 15  16 | | 9 | 12 |

TABLE 1-continued

| Sample Mark | A | B | C | D | E |
|---|---|---|---|---|---|
| 10-min gel, lb/100 sq ft | 13 | 11 | 21 | 22 | 13 | 16 |
| Stability, volts | | 1180 | | 1200 | | 1240 |
| Filtrate, ml at 400° F.-500 psi | | 7.2 | | 0.8 | | 20.4 |

As can be seen from the data in Table 1, the particulate polyolefin (SDP-113) is much more effective than conventional oil mud filtration control agents (DURATONE) in reducing fluid loss in invert muds (compare the results on Samples A and B).

EXAMPLE 2

Several of the invert emulsion muds shown in Table 1 were subjected to static aging under conditions shown in Table 2 below. Table 2 also gives the results of the rheological measurements, fluid loss, oil separation and solids settling.

TABLE 2

| Mud Sample (From Table 1) | A | B | E |
|---|---|---|---|
| Aged, hr, at 400° F. and 500 psi | 168 | 168 | 168 |
| Shear, lb/100 sq ft | 58 | 196 | 109 |
| Settling, inches | 3.5 | 0 | 0 |
| Settling, relative hardness | Firm | None | None |
| Stability, volts | 840 | 880 | 1440 |
| Top oil separation, inches | 1.25 | 0 | 0 |
| Stirred, min | 5 | 5 | 5 |
| Test temp, °F. | 90 | 90 | 100 |
| Plastic Viscosity, cp | 37 | 155 | 65 |
| Yield Point, lb/100 sq ft | 3 | 150 | 49 |
| 10-sec gel, lb/100 sq ft | 5 | 50 | 20 |
| 10-min gel, lb/100 sq ft | 10 | 70 | 31 |
| Stability, volts | 760 | 640 | 960 |
| Filtrate, ml at 400° F. and 500 psi | 162 (14 ml emulsion) | 7.0 All oil | 37.2 All oil |
| Cake, 32nds of an inch | 50 | 10 | 14 |

As can be seen from the results in Table 2, the fluid loss of invert muds containing the polyolefin (SDP-113) and after static aging is much less than that containing no polyolefin. Compare, for example, the results on mud sample A against the results on Samples B and E. As can also be seen from Table 2, there is no oil phase separation (top oil separation) on aged samples which contain the polyolefin. Lastly, the data in Table 2 show that the addition of the polyolefin to the invert muds prevents solids settling even after the muds having been aged under rather severe conditions.

EXAMPLE 3

To demonstrate the effectiveness of the present invention with a typical field invert mud, a 19.0 ppb invert mud (Shell's Hinojosa No. 1, Zapata County, Texas, E-896) was diluted 10% with a 50/50 volume mix of diesel oil and water to produce an 18.2 ppg mud having an 86/14 (vol) oil-water ratio. To obtain comparative results, a sample of the original 19.0 ppg mud (Sample A) was compared with samples of the 18.2 ppg mud one of which (Sample B) employed a typical viscosifying agent (GELTONE), a second sample of which (Sample C) contained SDP-113. Table 3 below shows the compositions of the muds, the results of the rheological property measurements and the measurements on oil and solids separation.

TABLE 3

| Sample Mark | A | B | C |
|---|---|---|---|
| E-896, bbl | 1.0 | 0.9 | 0.9 |
| Diesel oil, bbl | | 0.05 | 0.05 |
| Water, bbl | | 0.05 | 0.05 |
| INVERMUL "L", lb | | 2.0 | 2.0 |
| Lime, lb | | 3.0 | 3.0 |
| GELTONE, lb | | 2.0 | |
| SDP-113, lb | | | 1.0 |
| Stirred, min | 15 | 15 | 15 |
| Test temp, °F. | 100 | 100 | 100 |
| Plastic Viscosity, cp | 104 | 94 | 76 |
| Yield Point, lb/100 sq ft | 11 | 32 | 8 |
| 10-sec gel, lb/100 sq ft | 11 | 26 | 8 |
| 10-min gel, lb/100 sq ft | 20 | 38 | 14 |
| Electrical stability, volts | 1120 | 1120 | 980 |
| Aged, hr at 395° F.-500 psi | 16 | 16 | 16 |
| Shear, lb/100 sq ft | 80 | 138 | 120 |
| Settling, inches-hardness | 1.94-hard | 0.375-moderate | None |
| Stability, volts | 980 | 1080 | 1380 |
| Top oil separation, in | 0.125 | 0 | 0 |
| Stirred, min | 5 | 5 | 5 |
| Test temp, °F. | 100 | 100 | 100 |
| Plastic Viscosity, cp | 125 | 114 | 93 |
| Yield Point, lb/100 sq ft | 8 | 9 | 19 |
| 10-sec gel, lb/100 sq ft | 8 | 8 | 10 |
| 10-min gel, lb/100 sq ft | 10 | 22 | 25 |
| Electrical stability, volts | 1120 | 1040 | 1080 |
| Density, ppg | 19.0 | 18.2 | 18.2 |

As can be seen from the data in Table 3, Sample C which contained the polylefin showed no solids settling, while Sample B containing the conventional viscosifying agent normally used to prevent solids separation in oil based muds showed moderate solids settling. Note that the untreated field mud without any viscosifying agent or polyolefin (Sample A) showed significant solids settling.

The invention may be embodied in other specific forms without departing from the spirit or essential characteristics thereof. The foregoing embodiments are therefore to be considered, in all respects, as illustrative and not restrictive, the scope of the invention being indicated by the appended claims rather than by the foregoing description, and all changes which come within the meaning and range of equivalence of the claims are therefore intended to be embraced therein.

I claim:

1. An invert emulsion well servicing fluid consisting essentially of:
 a liquid hydrocarbon oleaginous phase, an aqueous phase, the volume ratio of said oleaginous phase to said aqueous phase being from about 99/1 to about 1/1, an invert emulsifying agent, from about 1 to about 20 ppb of said fluid of a finely divided, solid, particulate, linear, high density polyethylene having an average particle diameter of from about 15 to about 40 microns, said particles being generally spherically shaped, said polyethylene having a density of at least about 0.94 g/cc, and from about 0.5 to about 4 ppb of said fluid of an organophilic clay.

2. The well servicing fluid of claim 1 wherein the volume ratio of said oleaginous phase to said aqueous phase is from about 10:1 to about 2:1.

3. The well servicing fluid of claim 1 comprising, in addition, a filtration control agent.

4. The well servicing fluid of claim 1 wherein said oleaginous phase comprises a hydrocarbon oil, at least a part of which boils above 400° F. and which is selected from the class consisting of topped crude oil, gas oil, kerosene, diesel fuel, heavy alkylate, fractions of heavy alkylate, and mixtures thereof.

* * * * *